US008607289B2

(12) United States Patent
Brown et al.

(10) Patent No.: US 8,607,289 B2
(45) Date of Patent: *Dec. 10, 2013

(54) METHOD AND SYSTEM FOR DISTRIBUTING MEDIA CONTENT

(75) Inventors: William A. Brown, Woodstock, GA (US); Nicholas Peter Hill, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/555,653

(22) Filed: Jul. 23, 2012

(65) Prior Publication Data

US 2012/0291092 A1    Nov. 15, 2012

Related U.S. Application Data

(63) Continuation of application No. 12/209,765, filed on Sep. 12, 2008, now Pat. No. 8,255,964.

(51) Int. Cl.
*H04N 7/173* (2011.01)
(52) U.S. Cl.
USPC ............... 725/110; 725/25; 725/41; 725/43; 725/46; 725/80; 725/133; 725/141; 725/153; 726/27; 715/723; 379/142.16
(58) Field of Classification Search
None
See application file for complete search history.

(56) References Cited

U.S. PATENT DOCUMENTS

| | | |
|---|---|---|
| 2002/0088010 A1 | 7/2002 | Dudkiewicz |
| 2004/0096184 A1 | 5/2004 | Poslinski |
| 2005/0055713 A1 | 3/2005 | Lee |
| 2006/0161956 A1 | 7/2006 | Wasilewski |
| 2007/0101394 A1 | 5/2007 | Fu |
| 2007/0157251 A1 | 7/2007 | Shrivastava |
| 2007/0277205 A1 | 11/2007 | Grannan |

OTHER PUBLICATIONS

Meuninck, "Method and System for Presenting Media Content", U.S. Appl. No. 12/186,385 dated Aug. 5, 2008, 48 pages.
Zipcllp, "ZipClip Spread Your Fun—FAQ", 8 pages article, website last visited Jul. 23, 2008, http:www.zipclip.com/howtouse/html.

*Primary Examiner* — Jason J Chung
(74) *Attorney, Agent, or Firm* — Guntin & Gust, PLC; Ed Guntin

(57) ABSTRACT

A system that incorporates teachings of the present disclosure may include, for example, a set-top box operating from an interactive television (iTV) communication system having a controller to receive from the iTV communication system media content with metadata, record the media content, detect in the metadata a description of the media content correlating with one or more preferences in a preference profile, present at a media presentation device a first prompt requesting an acceptance or rejection of the media content, present at the media presentation device a second prompt requesting a selection of one or more communication devices to direct in whole or in part the media content thereto, detect the selection of at least one of the one or more communication devices, and transmit in whole or in part the media content to the at least one communication device. Other embodiments are disclosed.

19 Claims, 14 Drawing Sheets

600

800

METHOD AND SYSTEM FOR DISTRIBUTING MEDIA CONTENT

PRIOR APPLICATION

This application is a continuation of U.S. patent application Ser. No. 12/209,765 filed Sep. 12, 2008 by Brown et al., entitled "METHOD AND SYSTEM FOR DISTRIBUTING MEDIA CONTENT." All sections of the aforementioned application(s) are incorporated herein by reference in its entirety.

FIELD OF THE DISCLOSURE

The present disclosure relates generally to media content presentation and more specifically to a method and system for distributing media content.

BACKGROUND

The public Internet provides an abundance of media content such as audio content, still image content, moving image content, and combinations thereof. Other sources such as Internet Protocol Television (TV), cable TV, and satellite TV can also provide a wealth of media content. Consumers can browse these and other sources of media content, and in some instances store the media content on devices for personal use.

DETAILED DESCRIPTION

One embodiment of the present disclosure entails a set-top box (STB) operating from an interactive television (iTV) communication system having a controller to receive from the iTV communication system media content with metadata, record the media content, detect in the metadata a description of the media content correlating with one or more preferences in a preference profile, present at a media presentation device a first prompt requesting an acceptance or rejection of the media content, present at the media presentation device a second prompt requesting a selection of one or more communication devices to direct in whole or in part the media content thereto, detect the selection of at least one of the one or more communication devices, and transmit in whole or in part the media content to the at least one communication device.

Another embodiment of the present disclosure entails an STB operating from an iTV communication system having a controller to receive from the iTV communication system media content with metadata, record the media content while presented at a media presentation device, detect a request to redirect the media content, present at the media presentation device a prompt requesting a selection of one or more communication devices to direct in whole or in part the media content thereto, detect the selection of at least one of the one or more communication devices; and transmit in whole or in part the media content to the at least one communication device. In this embodiment, the one or more communication devices can exclude the STB, a digital media recorder integrated in the STB, and the digital media recorder operably coupled to the STB.

Yet another embodiment of the present disclosure entails selectively redirecting from an STB media content supplied with metadata by an iTV system responsive to detecting a correlation between the metadata and a preference profile.

Figure 1:
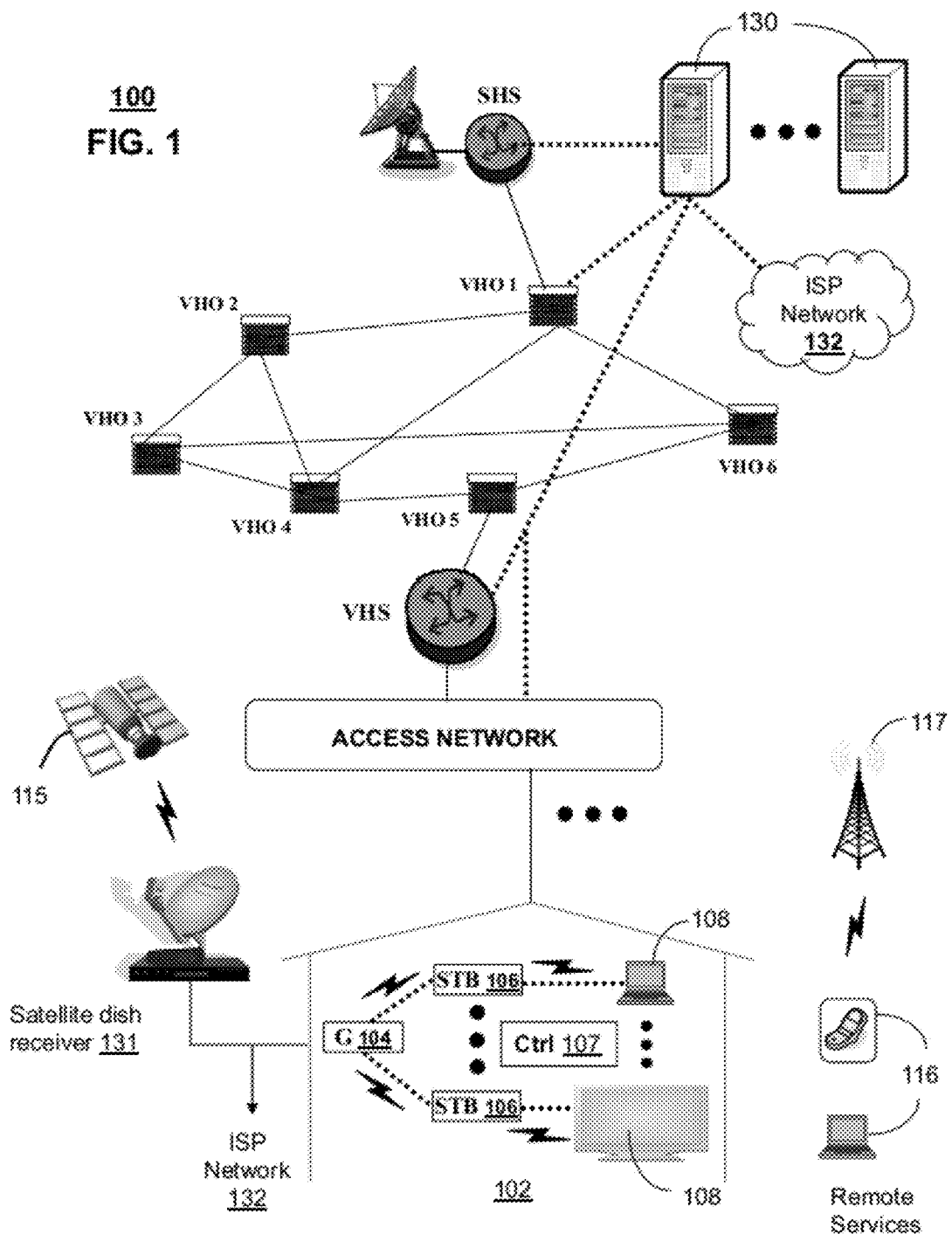
FIGS. 1-4 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via an access network to commercial and/or residential buildings 102 housing a gateway 104 (such as a residential gateway or RG). The access network can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (such as an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (such as GSM, CDMA, UMTS, WiMAX, etc.). Another distinct portion of the one or more computing devices 130 can be used as a media system 130 for distributing media content supplied by the first communication system 100 to devices operably coupled thereto.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
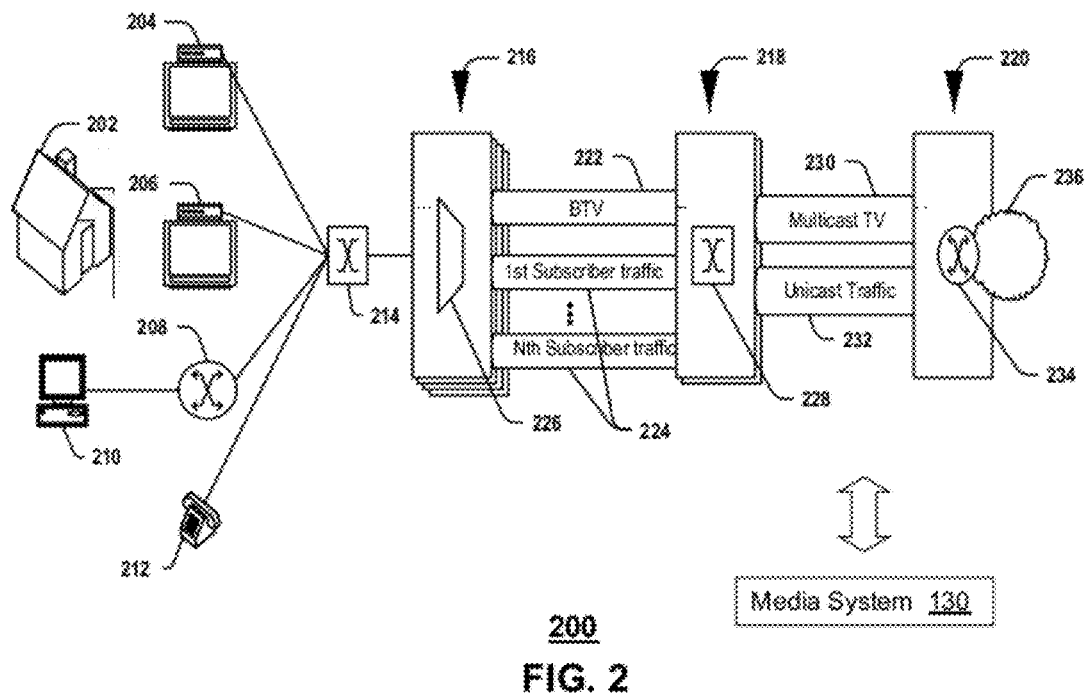

FIG. 2 depicts an illustrative embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The media system 130 of FIG. 1 can be operably coupled to the second communication system 200 for purposes similar to those described above.

Figure 3:
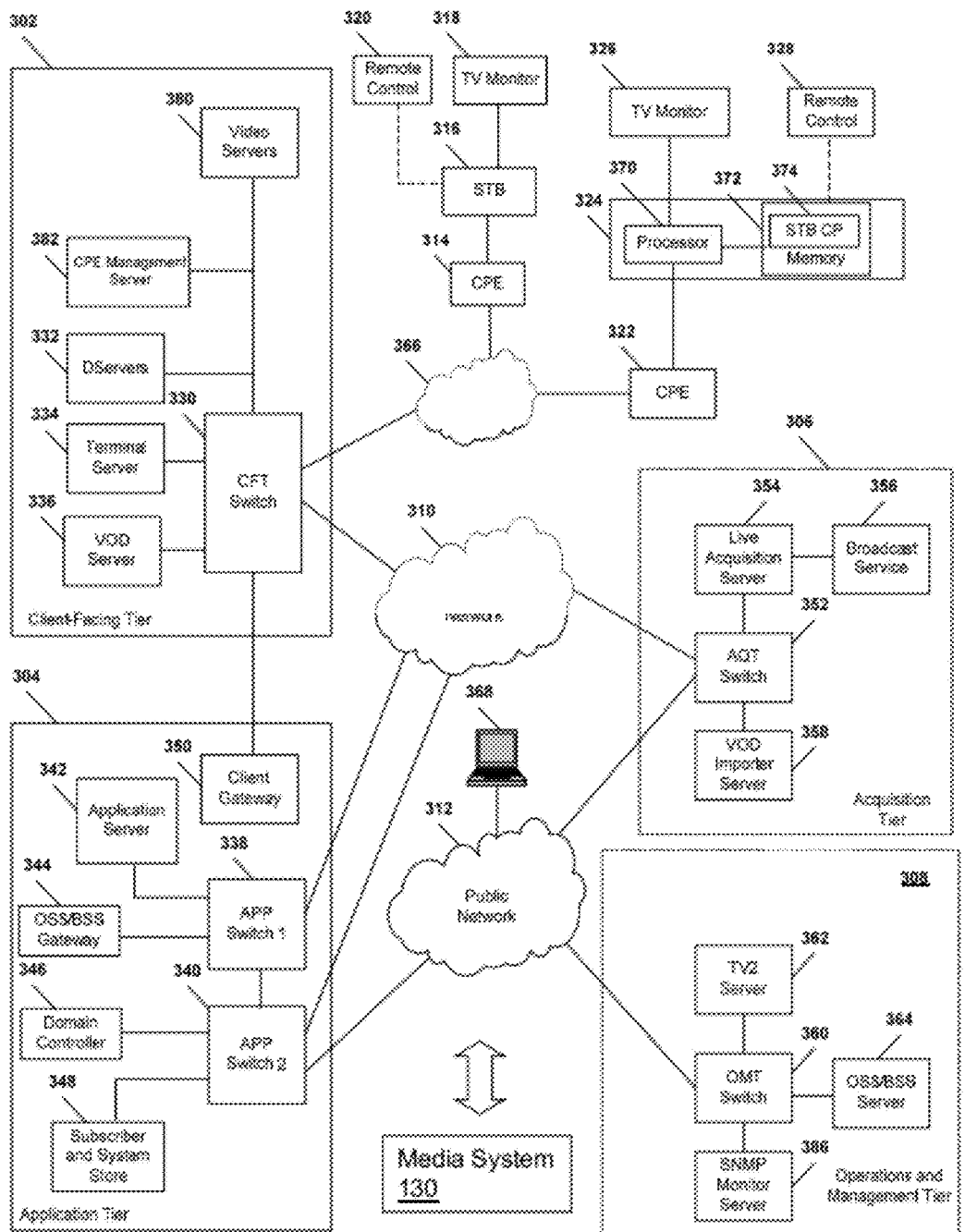

FIG. 3 depicts an illustrative embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an illustrative embodiment, the client-facing tier 302 can be coupled to the CPE 314, 322 via fiber optic cables. In another illustrative embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an illustrative, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite headend office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The media system 130 of FIG. 1 can be operably coupled to the third communication system 300 for purposes similar to those described above.

It should be apparent to one of ordinary skill in the art from the foregoing media communication system embodiments that other suitable media communication systems for distributing broadcast media content as well as peer-to-peer exchange of content can be applied to the present disclosure.

Figure 4:
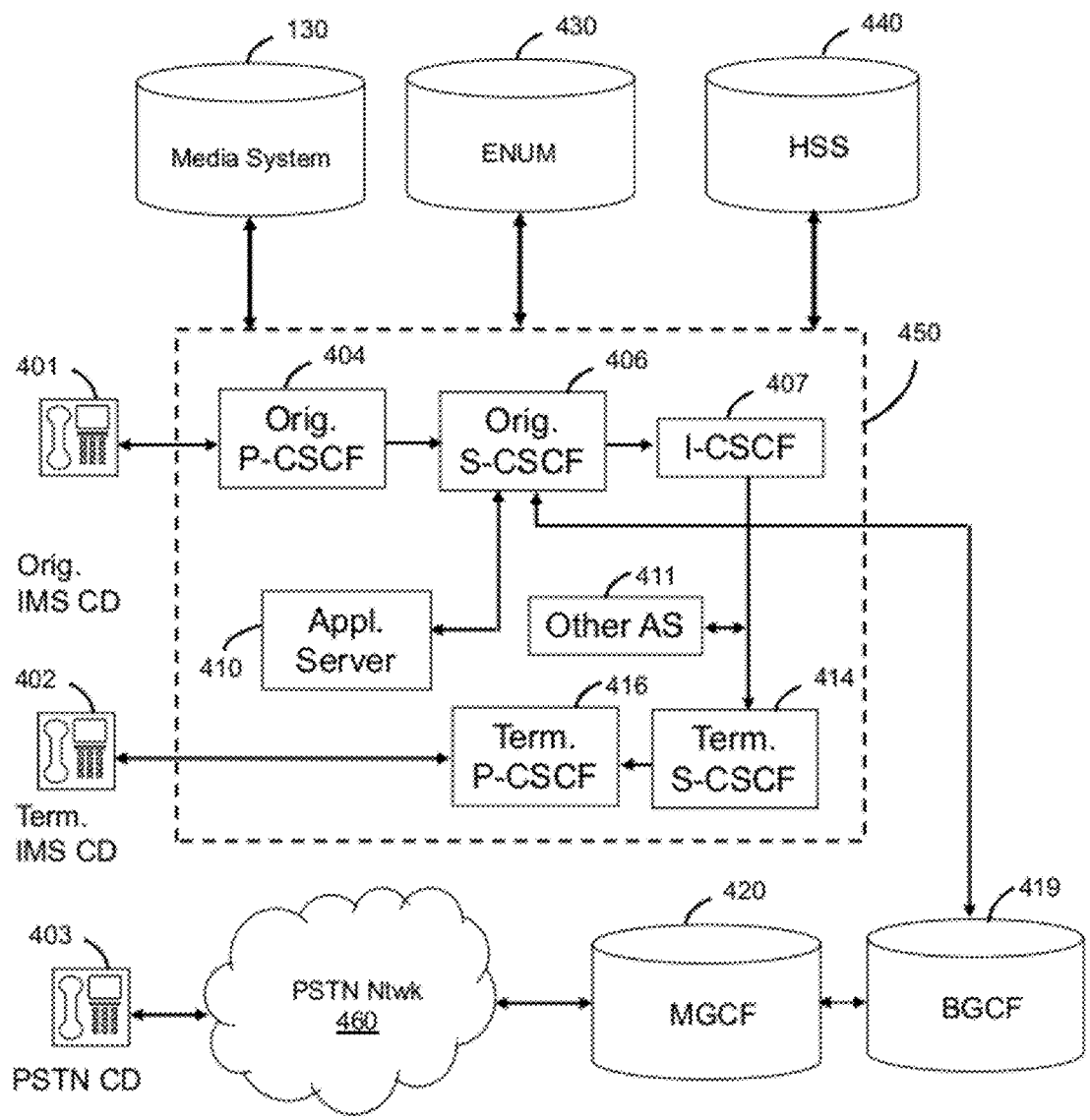

FIG. 4 depicts an illustrative embodiment of a communication system 400 employing an IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) supported by the HSS 440. To accomplish a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (such as *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

IMS network 450 can also be operably coupled to the media system 130 previously discussed for FIG. 1. In this representative embodiment, the media system 130 can be accessed over a PSTN or VoIP channel of communication system 400 by common techniques such as described above.

Figure 5:
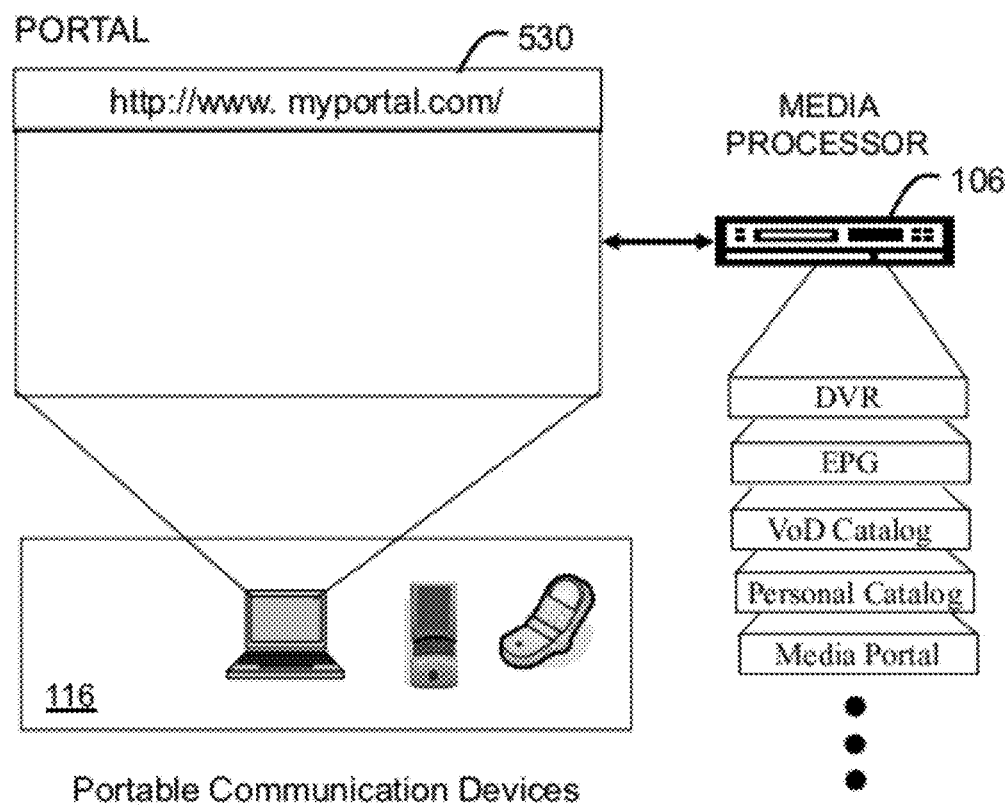
FIG. 5 depicts an illustrative embodiment of a portal interacting with at least one of the communication systems of FIGS. 1-4.

FIG. 5 depicts an illustrative embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog stored in the STB (such as personal videos, pictures, audio recordings, etc.), the media system 130, and so on.

Figure 6:
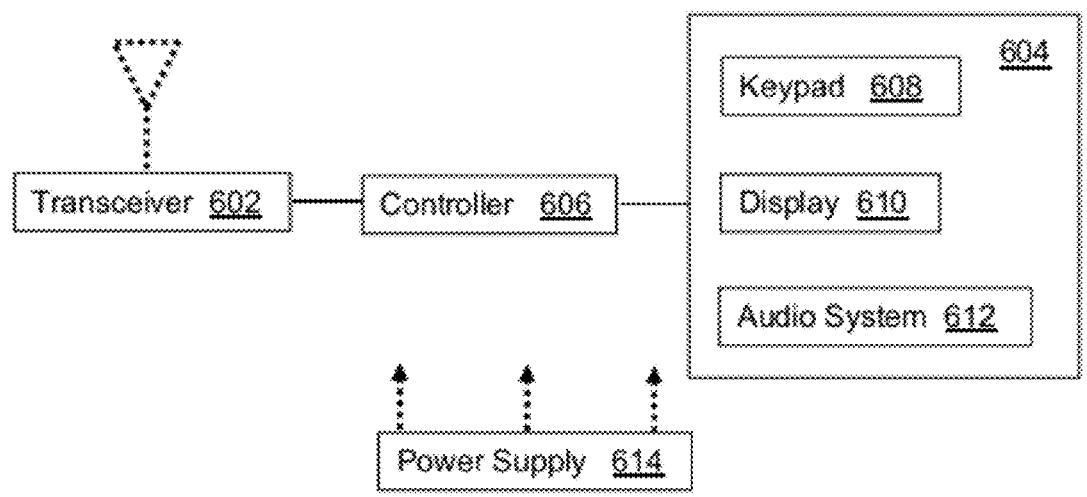
FIG. 6 depicts an illustrative embodiment of a communication device utilized in the communication systems of FIGS. 1-4.

FIG. 6 depicts an exemplary embodiment of a communication device 600. Communication device 600 can be a representative portion of any of the aforementioned communication devices of FIGS. 1-4. The communication device 604 can comprise a wireline or wireless transceiver 602 (herein transceiver 602), a user interface (UI) 604, a power supply 614, and a controller 606 for managing operations thereof. The transceiver 602 can utilize common wireless access technologies such as cellular, software defined radio (SDR) and/or WiMAX technologies, just to mention a few. Cellular technologies can include, for example, CDMA-1X, UMTS/HSDPA, GSM/GPRS, TDMA/EDGE, EV/DO, and next generation technologies as they arise.

In another embodiment, the transceiver 602 can support short-range wireless access technologies such as Bluetooth, WiFi, or cordless technologies such as Digital Enhanced Cordless Telecommunications (DECT) or Personal Handyphone System (PHS). In yet another embodiment the transceiver 602 can support wireline technologies such as a Public Switched Telephone Network (PSTN), VoIP or IMS communications.

The UI 604 can include a depressible or touch-sensitive keypad 608 with a roller ball or navigation disk for manipulating operations of the communication device 600. The UI 604 can further include a display 610 such as monochrome or color LCD (Liquid Crystal Display) or plasma display for conveying images to the end user of the communication device 600. In an embodiment where the display 610 is touch-sensitive, a portion of the keypad 608 can be presented by way of the display. The UI 604 can also include an audio system 612 that utilizes common audio technology for conveying low volume audio (such as audio heard only in the proximity of a human ear) and high volume audio (e.g., speakerphone for hands free operation). The audio system 612 can further include a microphone for intercepting audible signals of an end user.

The power supply 614 can utilize common power management technologies such as replaceable batteries, supply regulation technologies, and charging system technologies for supplying energy to the components of the communication device 600 to facilitate long-range or short-range mobility applications. The controller 606 can utilize computing technologies such as a microprocessor and/or digital signal processor (DSP) with associated storage memory such a Flash, ROM, RAM, SRAM, DRAM or other storage technologies.

Figure 7:
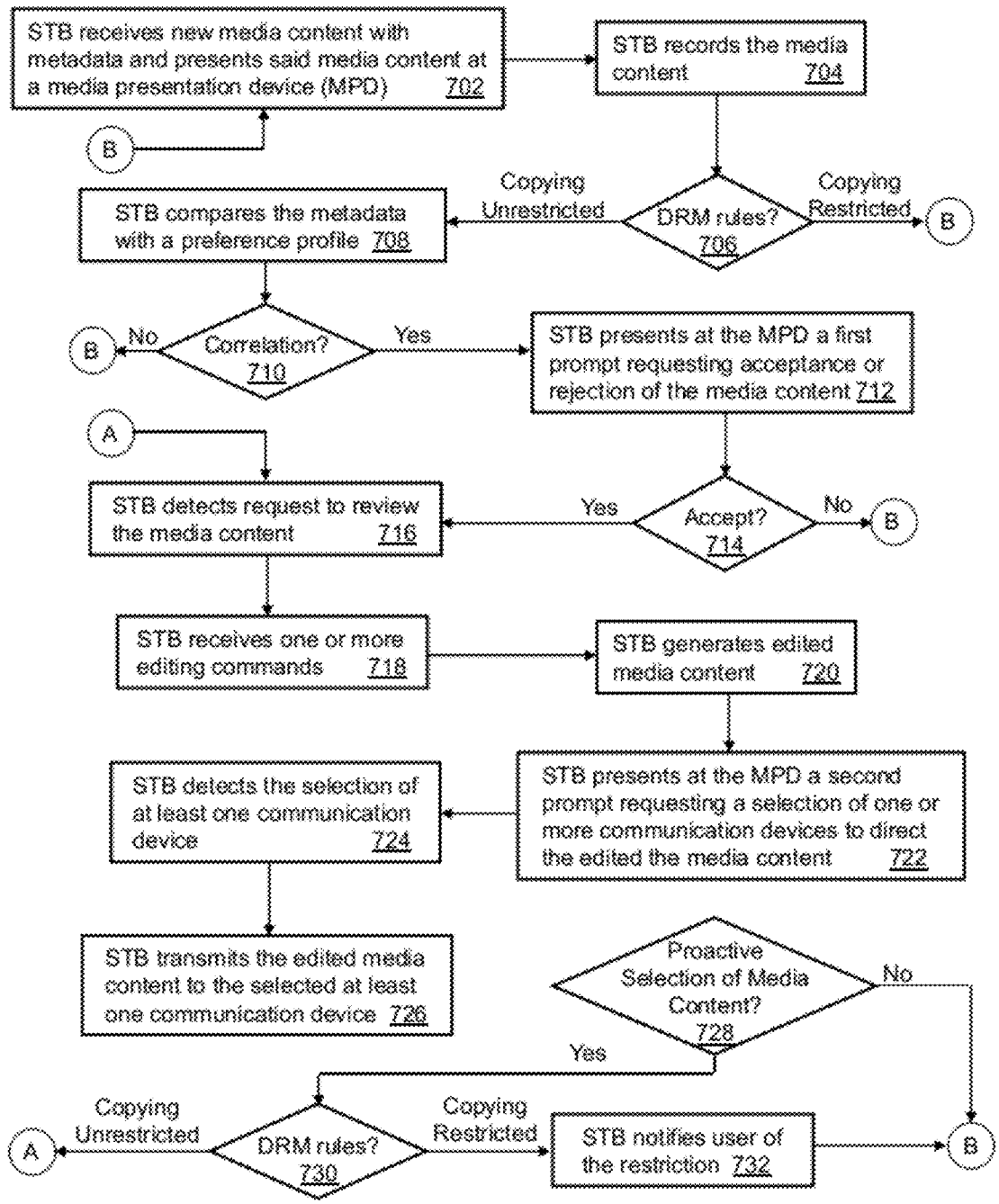
FIG. 7 depicts an illustrative method operating in portions of the communication systems of FIGS. 1-4.
Figure 8:
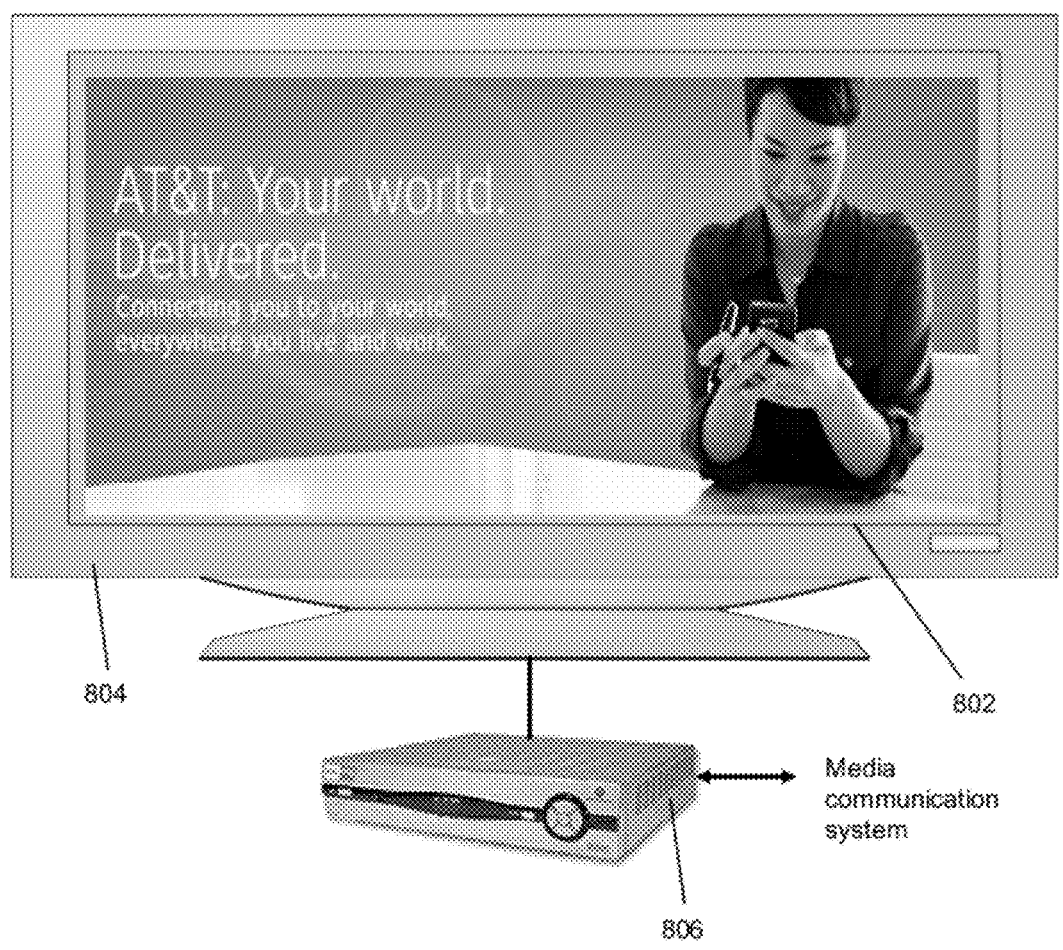
FIGS. 8-13 depict illustrative embodiments of the method of FIG. 7.

FIG. 7 depicts an illustrative method 700 operating in portions of communication systems 100-400. FIGS. 8-13 depict illustrative embodiments of graphical users interfaces (GUIs) resulting from method 700. Method 700 can begin with step 702 in which an STB such as the references described in FIGS. 1-3 receives new media content with metadata which it presents at a media presentation device such as a TV unit 804 of FIG. 8. FIG. 8 depicts media content such as an advertisement 804 presented on the TV unit 804 which is operably coupled to the STB 806.

In step 704, the STB can be programmed to record the media content for potential use later. The STB can record the media content according to start and end delimiters of the media content defined in the metadata supplied therewith. The STB can further determine in step 706 whether digital rights management (DRM) rules are included in the metadata of the received media content. If the DRM rules indicate that there is a copyright restriction, then the STB can ignore a determination as to whether the media content may be of interest to a user of the STB for distribution to communication devices of said user as well as friends and/or family. Responsive to a copyright restriction, the STB can proceed to step 702 and restart the process for subsequent new content received by the STB.

If DRM rules do not restrict a distribution of a copy of the media content in whole or in part, the STB can proceed to step 708 where it compares the metadata of the media content to a preference profile. The preference profile can include user preferences and/or behavioral data. The user preferences can represent preferences for media content consumption established by a user of the STB (e.g., genre preferences, perform preferences, music preferences, etc.). Behavioral data can be generated by common tools operating in the STB that can detect behavioral patterns from observations of media content consumed by the user of the STB. From the detected patterns, these tools can also be used to identify media content preferences.

The user preferences and/or behavior data can be used by the STB in step 708 to automatically detect media content which the user may be interested in distributing to one or more communication devices of the user, as well as friends and family. If no correlation between the user preferences and/or behavioral data is detected in the metadata in step 710, the STB can return to step 702 and apply the aforementioned steps with subsequent new media content. Correlation can be based on common statistical analysis of the metadata information when compared to the preference profile. Any suitable matching or correlation technique can be applied to step 710.

Figure 9:
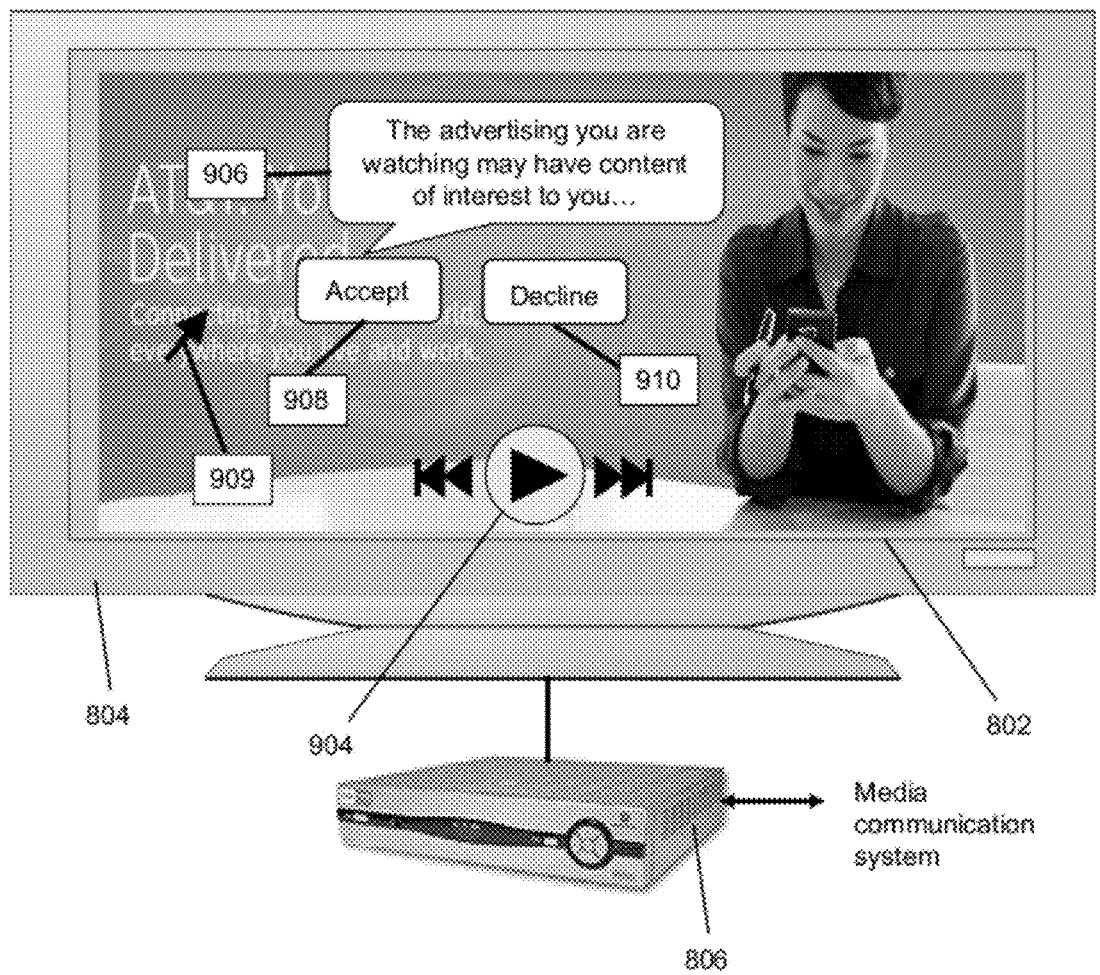
Figure 10:
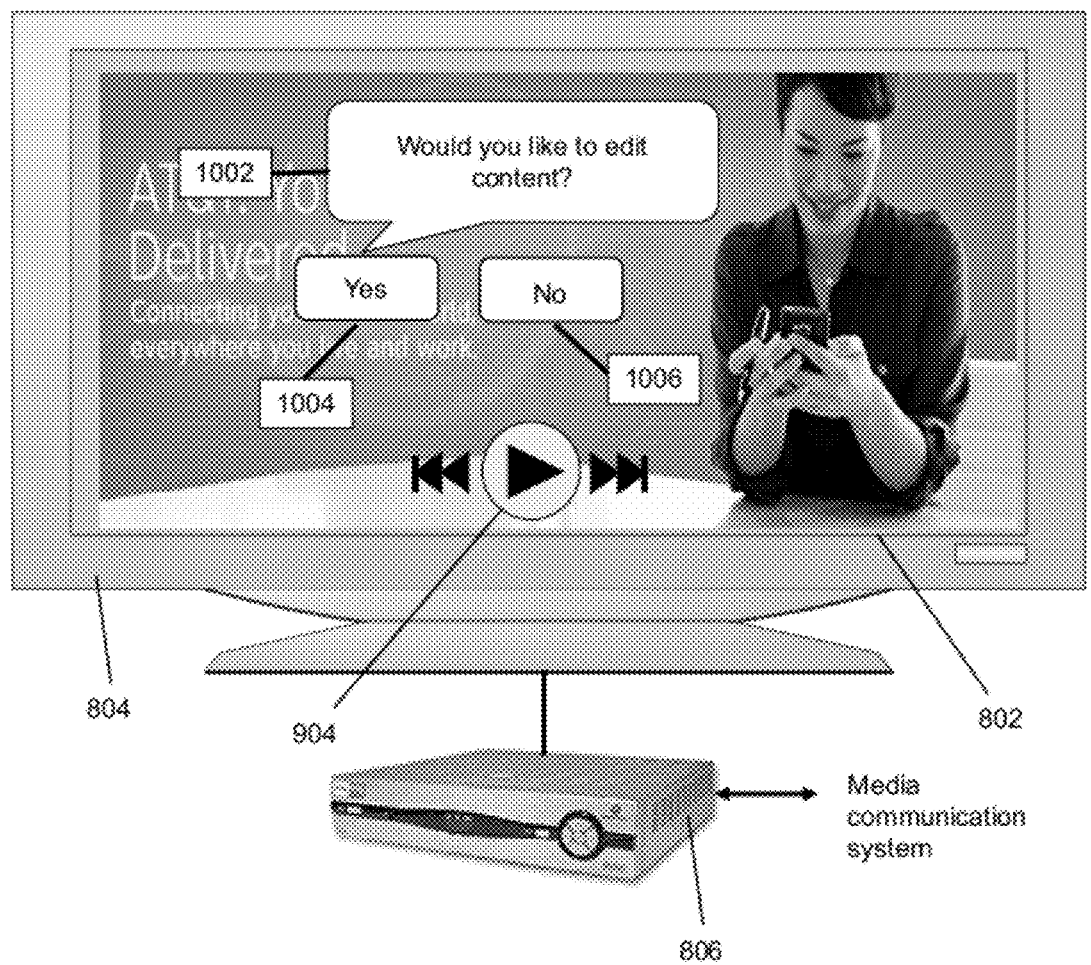

If a desired level of correlation is found, the STB can proceed to step 712 where it presents on the media presentation device a first prompt which requests an acceptance or rejection of the media content. FIG. 9 depicts an illustrative embodiment of this step. The caption 906 depicts the prompt with a selectable Accept GUI element 908 or Reject GUI element 910 that can be selected by a common pointer 909 managed by a remote controller such as reference 107. To assist the user in determining whether to accept or reject the proposed media content, the user can utilize common media presentation controls 904 (such as a playback function, rewind function, forward function, and pause). If the user rejects the proposed media content, the STB can proceed to step 702 and apply the foregoing steps with subsequent media content.

Figure 11:
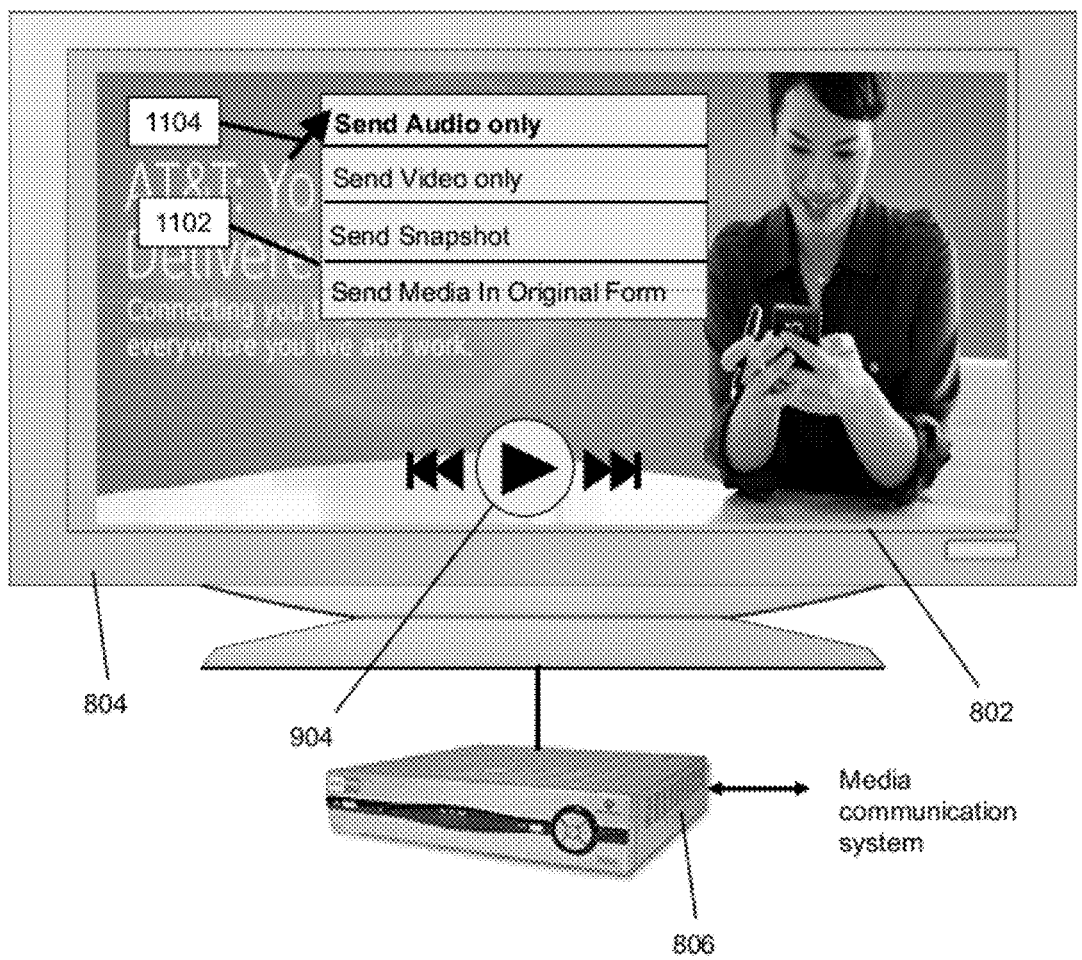

If the media content is accepted, the STB can detect in step 716 a request to review the media content responsive to manipulating the presentation controls of step 904 (e.g., a rewind request, or playback request). In step 718, the STB can receive one or more editing commands for manipulating portions of the proposed media content. This step can represent a right click of a mouse pointer 1104, which signals the STB to present a drop-down menu 1102 as shown in FIG. 11. This menu can provide the user a means to selectively choose portions of the media content (e.g., audio only, video only, a particular frame or still image shot, or the media content in its original form). In the present illustration, the user has selected to send only the audio portion of the proposed media content (see reference 1104), which in turn generates edited media content in step 720. The media content edits can be performed by the STB with common media editing tools.

Figure 12:
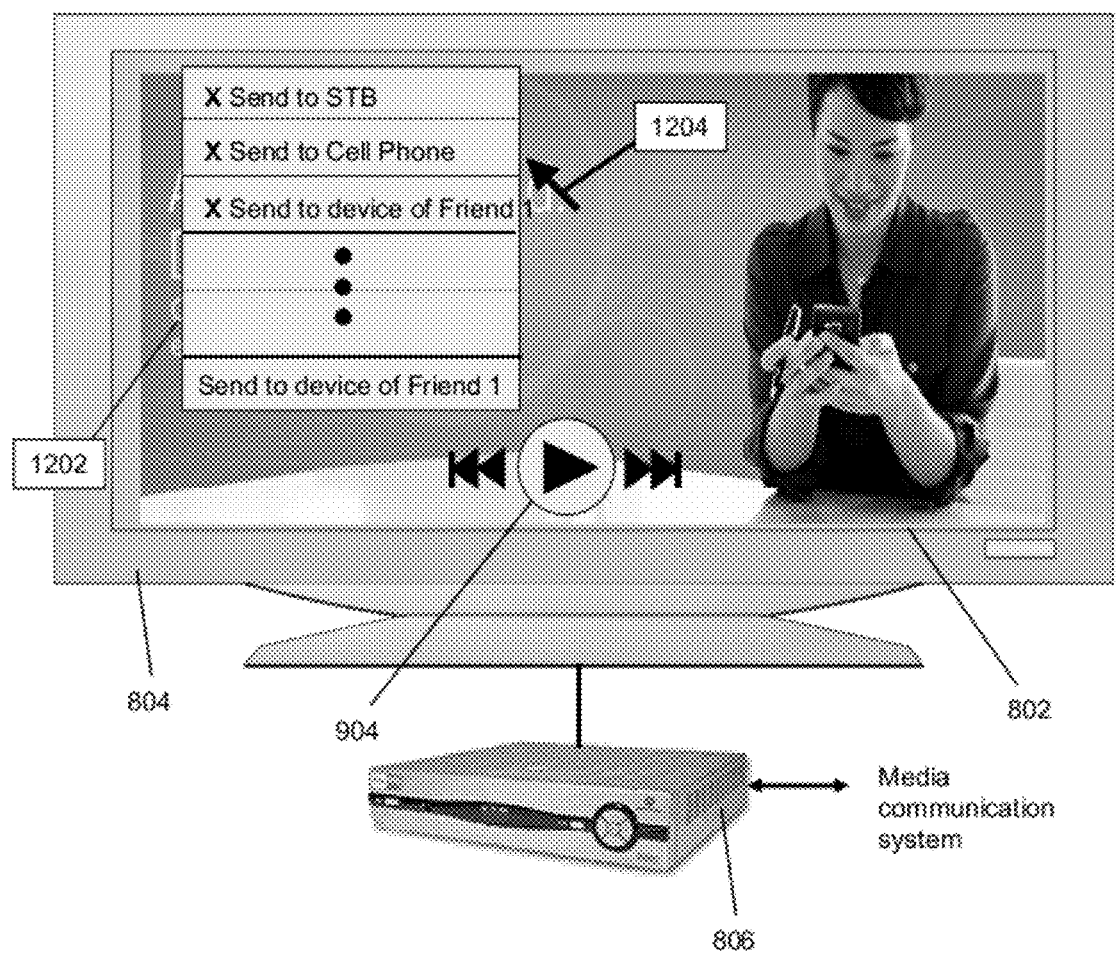
Figure 13:
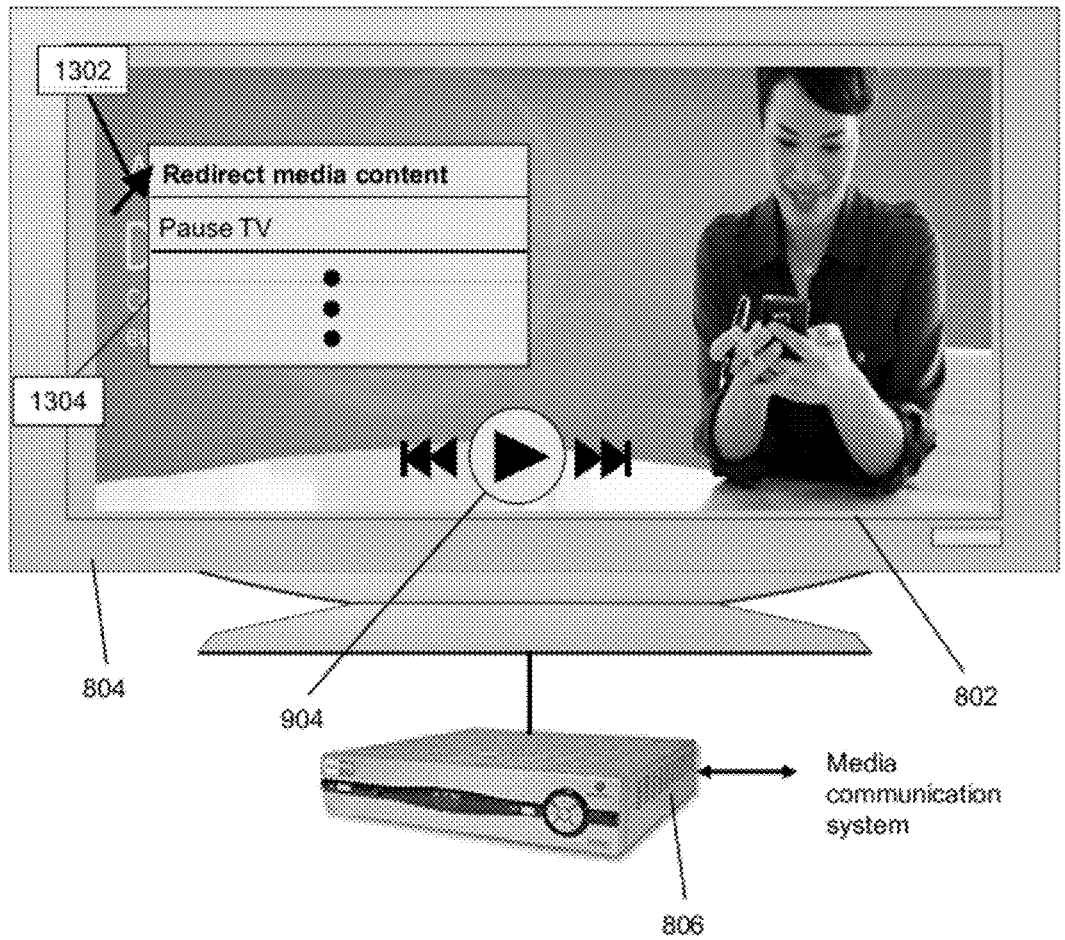

In step 722, the STB can present at the media presentation device a second prompt listing one or more communication devices for distributing the edited media content generated in step 720. FIG. 12 depicts an illustration of this step. In this step, the STB can allow the user to send the edited media content to more than one communication device. In this illustration, the multi-device selection is depicted by an "X" next to each device. The targeted communication devices are the STB itself, a long-range mobility communication device such as a cell phone, and a friend's communication device. Other possible devices include a short-range mobility communication device such as a cordless DECT phone, a media player, a gaming console, a computer, other STBs, or any other suitable communication device that can present media content in its various forms (still images, moving images, audio, or combinations thereof).

The preference profile can include a list of the communication devices listed in FIG. 12 along with corresponding communication identifiers to establish communications therewith. Communication identifiers can include an E.164 telephone number, a SIP URI, a static or dynamic IP address, an email address, a short messaging service (SMS) identifier, a multimedia messaging service (MMS) identifier, an instant messaging (IM) service identifier, an identifier assigned to a computer by an operating system of said computer, a globally unique identifier (GUID) of an STB, or any other suitable form of present and next generation communication identifiers applicable to the present disclosure.

Once a selection of at least one communication device is detected in step 724, the STB can proceed to step 726 where it transmits the edited media content to the selected communication devices according to its corresponding communication identifiers. The media content transmitted to the selected communication devices can be used for any purpose. For instance, in the case of a cell phone, the audio-only media content generated in step 720 can be utilized as a ringtone. If still image content had been generated in step 720, said content can be used at the receiving communication devices as wallpaper media. It would be apparent to an artisan of ordinary skill in the art that the media content can be utilized by a receiving communication device for any common media consumption purpose available today or in next generation media devices.

Steps 728-730 can be invoked by the user of the STB at any time independent of the automated steps of method 700. For instance, if the user is presented with media content which is of interest to said user, and the STB does not propose this content for distribution, the user can select the content in step 728 notifying the STB that the user wants to distribute said content. The user can perform step 728 by selecting the media content with a pointer such as reference 1302 of FIG. 13, right-click a mouse button, and request distribution of said content from a list of options 1304. If presentation of the media content has been completed before the user has time to select the content, the user can rewind the media content using an auto recording features of a DVR of the STB (or operably coupled thereto), and make the selection thereafter. The auto recording feature of the DVR can store both the media content and its associated metadata.

The STB can be programmed in step 730 to determine if copyright restrictions are noted in the metadata of the selected media content. If distribution in whole or in part of the media content is restricted, the STB can notify the user in step 732 of said restriction, and continue processing media content in the background starting from step 702. Otherwise, the STB can process the selected media content form step 716 where the user can perform media presentation and editing functions as described earlier.

Upon reviewing the aforementioned embodiments, it would be evident to an artisan with ordinary skill in the art that said embodiments can be modified, reduced, or enhanced without departing from the scope and spirit of the claims described below. For example, method 700 can be adapted so that the function described in the STB can operate from another network element of the media communication systems of FIGS. 1-4 such as the media system 130. In another illustrative embodiment, method 700 can be adapted so that media content detected by the STB or media system 130, or selected proactively by the user, is identified for storage purposes by metadata pointers. When distributing media content to one or more communication devices, said content can be retrieved according to the metadata pointers. Editing commands can be stored with the pointers for later processing upon receiving a request from one of said communication devices. In this embodiment, the STB and/or the media system 130 can save storage space by operating with metadata pointers.

In yet another embodiment, method 700 can be adapted to allow the user to send the media content to the targeted communication devices in more than one format. For instance, step 718 can represent the selection in FIG. 11 of audio, and a snapshot of the media content. Accordingly, in step 720 the STB can be programmed to generate two files: one with an audio portion of the media content, and one with a still image frame. The receiving communication devices (such as a cell phone) can utilize the different forms of the media content for different purposes (e.g., ringtone and wallpaper) without having to perform the editing steps at said devices.

In another illustrative embodiment, method 700 can be adapted so that a user of the STB can choose to disable temporarily or for an extended period of time the automatic media detection feature of steps 706-714. In this embodiment, the STB can rely on the proactive activity of the user as depicted by step 728 to distribute media content. This embodiment can provide the user of the STB the flexibility to alternate between media detection methods if desired.

Other suitable modifications can be applied to the present disclosure without departing from the scope of the claims below. Accordingly, the reader is directed to the claims section for a fuller understanding of the breadth and scope of the present disclosure.

Figure 14:
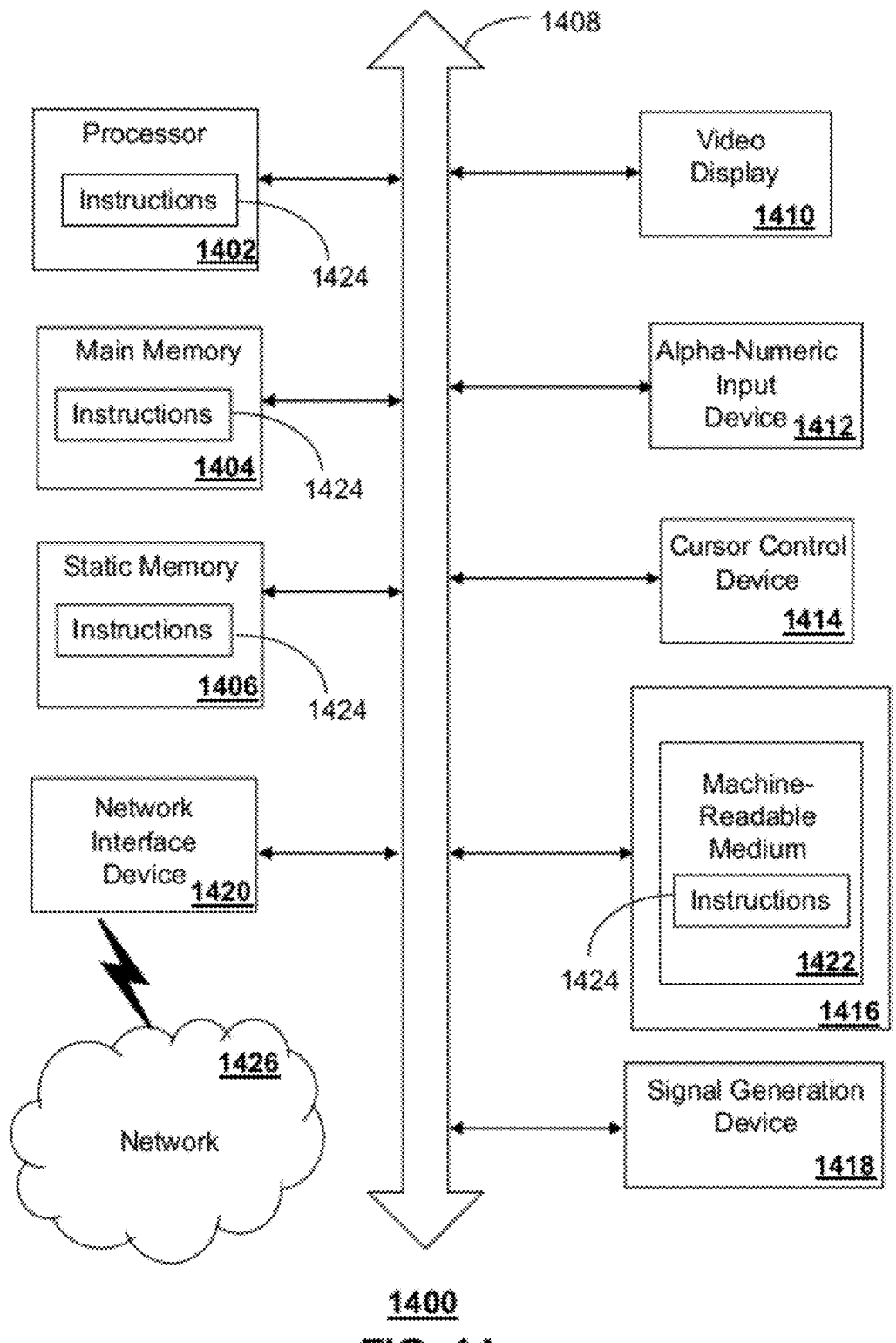
FIG. 14 is a diagrammatic representation of a machine in the form of a computer system within which a set of instructions, when executed, may cause the machine to perform any one or more of the methodologies discussed herein.

FIG. 14 depicts an exemplary diagrammatic representation of a machine in the form of a computer system 1400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1400 may include a processor 1402 (e.g., a central processing unit (CPU), a graphics processing unit (GPU, or both), a main memory 1404 and a static memory 1406, which communicate with each other via a bus 1408. The computer system 1400 may further include a video display unit 1410 (e.g., a liquid crystal display (LCD), a flat panel, a solid state display, or a cathode ray tube (CRT)). The computer system 1400 may include an input device 1412 (e.g., a keyboard), a cursor control device 1414 (e.g., a mouse), a disk drive unit 1416, a signal generation device 1418 (e.g., a speaker or remote control) and a network interface device 1420.

The disk drive unit 1416 may include a machine-readable medium 1422 on which is stored one or more sets of instructions (e.g., software 1424) embodying any one or more of the methodologies or functions described herein, including those methods illustrated above. The instructions 1424 may also reside, completely or at least partially, within the main memory 1404, the static memory 1406, and/or within the processor 1402 during execution thereof by the computer system 1400. The main memory 1404 and the processor 1402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1424, or that which receives and executes instructions 1424 from a propagated signal so that a device connected to a network environment 1426 can send or receive voice, video or data, and to communicate over the network 1426 using the instructions 1424. The instructions 1424 may further be transmitted or received over a network 1426 via the network interface device 1420.

While the machine-readable medium 1422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A media processor, comprising:
   a memory for storing computer instructions; and
   a controller coupled to the memory, which when executed by the controller, causes the controller to perform operations comprising:
   receiving media content with metadata;
   recording the media content;
   detecting digital rights management rules in the metadata;
   enabling a presentation of a first prompt responsive to determining that distribution of a copy of the recorded media content in whole or in part does not violate the one or more digital rights management rules;
   detecting in the metadata a description of the media content that correlates with one or more user preferences of a user profile;
   presenting the first prompt requesting an acceptance or a rejection of the recorded media content responsive to the detected correlation;
   responsive to receiving first user input indicating the acceptance of the recorded media content:
      presenting a second prompt requesting a selection of a communication device from a plurality of communication devices;
      receiving second user input indicating the selection of the communication device from the plurality of communication devices;
      transmitting an audio portion, an image portion, or both of the recorded media content to the selected communication device, wherein the audio portion is for use by the selected communication device as an audio playback responsive to an incoming communication, and wherein the image portion is for use by the selected communication device as a background setting;
   receiving third user input to enable editing of the recorded media content;
   receiving one or more editing commands; and
   editing the recorded media content according to the one or more editing commands, wherein the media content is received from an interactive television communication system, and wherein the interactive television communication system comprises one of an internet protocol television communication system, a cable television communication system, or a satellite television communication system.

2. The media processor of claim 1, wherein the incoming communication is a telephone call.

3. The media processor of claim 1, wherein the audio playback comprises a ringtone.

4. The media processor of claim 1, wherein the controller further performs operations comprising monitoring consumption of media content to generate the one or more user preferences.

5. The media processor of claim 1, wherein the user profile comprises a communication identifier for each of the plurality of communication devices, and wherein the controller further performs operations comprising initiating communication with the selected communication device according to the communication identifier of the selected communication device.

6. The media processor of claim 5, wherein each communication identifier comprises at least one of an E.164 telephone number, a session initiation protocol uniform resource identifier, an internet protocol address, an email address, a short messaging service identifier, a multimedia messaging service identifier, an instant messaging service identifier, or a globally unique identifier.

7. The media processor of claim 1, wherein the media processor is a set-top box, and wherein the selected communication device comprises a portable communication device, a media player, a gaming console, or a computer.

8. The media processor of claim 1, wherein the recording of the media content comprises recording the media content according to a start and end delimiter supplied in the metadata.

9. A non-transitory computer-readable storage medium comprising computer instructions, which when executed by a processor, cause the processor to perform operations comprising:
receiving media content with metadata from an interactive television communication system;
recording the media content while the media content is presented at a media presentation device;
detecting one or more digital rights management rules in the metadata;
enabling distribution of a copy of the media content in whole or in part according to the one or more digital rights management rules;
causing the media presentation device to present a first prompt requesting an acceptance or rejection of the recorded media content responsive to a detected correlation between the metadata and one or more preferences in a preference profile;
responsive to receiving a first response indicating the acceptance of the recorded media content:
causing the media presentation device to present a second prompt requesting a selection of a communication device from a plurality of communication devices;
transmitting one of an audio portion, an image portion, or both of the recorded media content to the selected communication device responsive to receiving a second response indicating the selection of the communication device;
receiving a third response to enable editing of the recorded media content;
receiving one or more editing commands; and
editing the recorded media content according to the one or more editing commands, wherein the audio portion is for use by the selected communication device as an audio playback responsive to an incoming communication, wherein the image portion is for use by the selected communication device as a background setting, and wherein the interactive television communication system comprises one or an internet protocol television communication system, a cable television communication system, or a satellite television communication system.

10. The non-transitory computer-readable storage medium of claim 9, wherein the incoming communication is a telephone call.

11. The non-transitory computer-readable storage medium of claim 9, wherein the audio playback comprises a ringtone.

12. The non-transitory computer-readable storage medium of claim 9, wherein the processor further performs operations comprising initiating communication with the selected communication device according to a communication identifier of the selected communication device.

13. The non-transitory computer-readable storage medium of claim 12, wherein the communication identifier comprises at least one of an E.164 telephone number, a session initiation protocol uniform resource identifier, an internet protocol address, an email address, a short messaging service identifier, a multimedia messaging service identifier, an instant messaging service identifier, or a globally unique identifier.

14. The non-transitory computer-readable storage medium of claim 9, wherein the selected communication device comprises a portable communication device, a media player, a gaming console, or a computer.

15. The non-transitory computer-readable storage medium of claim 9, wherein the recording of the media content comprises recording the media content according to a start and end delimiter supplied in the metadata.

16. A method, comprising:
receiving, by a processor, media content with metadata;
recording, by the processor, the media content;
detecting, by the processor, one or more digital rights management rules in the metadata;
permitting, by the processor, distribution of a copy of the recorded media content according to the one or more digital rights management rules;
presenting, by the processor, a first prompt requesting an acceptance or a rejection of the recorded media content responsive to the detecting a correlation between a description of the media content supplied in the metadata and one or more user preferences;
responsive to receiving a first response indicating the acceptance of the recorded media content:
presenting, by the processor, a second prompt requesting a selection of a communication device from a plurality of communication devices; and
transmitting, by the processor, one of an audio portion, an image portion, or both of the recorded media content to the selected communication device responsive to receiving a second response indicating the selection of the communication device;
receiving one or more editing commands; and
editing the recorded media content according to the one or more editing commands, wherein the audio portion is for use by the selected communication device as an audio playback responsive to an incoming communication, wherein the image portion is for use by the selected communication device as a background setting, and wherein the media content is received from an interactive television communication system, and wherein the interactive television communication system comprises one of an internet protocol television communication system, a cable television communication system, or a satellite television communication system.

17. The method of claim 16, wherein the recording of the media content comprises recording the media content according to a start and end delimiter supplied in the metadata.

18. The method of claim 16, wherein the incoming communication is a telephone call.

19. The method of claim 16, wherein the audio playback comprises a ringtone.

* * * * *